United States Patent [19]

Janssen et al.

[11] Patent Number: 5,954,817
[45] Date of Patent: Sep. 21, 1999

[54] APPARATUS AND METHOD FOR SECURING ELECTRONIC INFORMATION IN A WIRELESS COMMUNICATION DEVICE

[75] Inventors: John Jerome Janssen, Round Lake Beach; Steven J. Olsen, Libertyville, both of Ill.

[73] Assignee: Motorola, Inc., Schaumburg, Ill.

[21] Appl. No.: 08/775,656

[22] Filed: Dec. 31, 1996

[51] Int. Cl.$^6$ .................................................. G06F 12/14
[52] U.S. Cl. ............... 713/200; 340/825.31; 340/825.34
[58] Field of Search ........................ 340/825.31, 825.34; 380/3, 4, 25, 30; 395/186, 187.01, 188.01, 200.59

[56] References Cited

U.S. PATENT DOCUMENTS

| | | | |
|---|---|---|---|
| 4,590,552 | 5/1986 | Guttag et al. | 711/163 |
| 4,698,750 | 10/1987 | Wilkie et al. | 365/185.04 |
| 5,379,212 | 1/1995 | Sarner et al. | 705/412 |
| 5,432,950 | 7/1995 | Sibigtroth | 711/163 |
| 5,488,631 | 1/1996 | Gold et al. | 380/34 |
| 5,552,776 | 9/1996 | Wade et al. | 340/825.31 |
| 5,771,348 | 6/1998 | Kubatzki et al. | 395/186 |

FOREIGN PATENT DOCUMENTS

WO 93/10498  5/1993  WIPO.

Primary Examiner—Robert W. Beausoliel, Jr.
Assistant Examiner—Pierre E. Elisca
Attorney, Agent, or Firm—Mark D. Patrick

[57] ABSTRACT

An apparatus (200) for securing electronic information (205) includes a microcontroller (202) and an external memory (204) coupled thereto. The microcontroller (202) comprises a one-time programmable security flag (230) that is programmed when the electronic information (205) is stored in the memory (204). Once programmed, the security flag prevents reprogramming of the memory (204). Additionally, the microcontroller (202) comprises an algorithm (400) that generates electronic authentication information (207) from the electronic information (205). The authentication information (207) is stored in the memory (204) along with the electronic information (205). Upon retrieval from the memory (204) for registration, the electronic information (205) is authenticated by generating new electronic authentication information (508) via the algorithm (400) to compare to the authentication information (207) stored in the memory (204). Such authentication prevents swapping out of the memory (204) to gain system access.

26 Claims, 4 Drawing Sheets

APPARATUS AND METHOD FOR SECURING ELECTRONIC INFORMATION IN A WIRELESS COMMUNICATION DEVICE

FIELD OF THE INVENTION

The present invention relates generally to a wireless communication device and more particularly to electronic information stored in a wireless communication device.

BACKGROUND OF THE INVENTION

Wireless communication systems have become increasingly common. In such systems, a subscriber uses a local communication device, such as a portable cellular telephone, to communicate with a remote communication device, such as a cellular base station. Communication is accomplished via the transmission of radio frequency (RF) signals between the local device and the remote device.

To initiate communication, the local device communicates electronic information, such as an electronic serial number (ESN), to the remote device for registration. Upon receipt, the remote device determines whether the local device is permitted to make calls in the system based on the ESN. Aside from being used for limiting system access only to authorized users, the ESN is used for billing subscribers for calls made over the system.

In many wireless communication systems, the ESN is transmitted to the remote device in an un-encrypted manner and, thus, it is not secret and is susceptible to receipt by an unauthorized party. The unauthorized party may engage in fraudulent activity by programming the electronic information into, and making counterfeit calls via, a local device. Such fraud results in billing authorized subscribers for calls they did not make.

In the past, the risk of fraud was reduced by storing the ESN in a non-volatile memory device within a semiconductor device, such as an integrated circuit. More specifically, the ESN was stored in an EEPROM (electrically erasable programmable read only memory) that was internally disposed in a microcontroller employed by the local communication device. In operation, the EEPROM could not be accessed via the pinouts of the microprocessor and, thus, could not easily be reprogrammed or replaced with a "cloned" ESN.

However, combining an EEPROM on the same integrated circuit as a microcontroller is very expensive. The semiconductor manufacturing processes capable of providing non-volatile memory devices are expensive relative to those processes capable of providing logic circuitry only. Also, where the non-volatile memory and the logic circuitry are combined in a single microcontroller, yield reductions due to non-volatile memory programming failures can greatly increase the expense of the finished product.

Therefore, what is needed is an apparatus and method for securing electronic information, such as an ESN, that does not require the use of a non-volatile memory device packaged within a microcontroller device.

DETAILED DESCRIPTION OF THE PREFERRED EMBODIMENTS

An apparatus for securing electronic information includes a non-volatile memory and a microcontroller. The memory is externally coupled to the microcontroller. The microcontroller comprises a one-time programmable security flag that is programmed when the electronic information is stored in the memory. Once programmed, the security flag prevents reprogramming of the memory. Additionally, the microcontroller comprises an encryption algorithm that generates electronic authentication information during programming of the electronic information. The electronic authentication information is stored in the memory along with the electronic information. Upon retrieval from the memory for registration, the electronic information is authenticated by generating new electronic authentication information via the encryption algorithm to compare to the electronic authentication information stored in the memory. Such authentication prevents swapping out of the memory to gain system access. Thus, unlike the previous apparatuses, the present apparatus secures electronic information in a memory external to a microcontroller.

Figure 1:
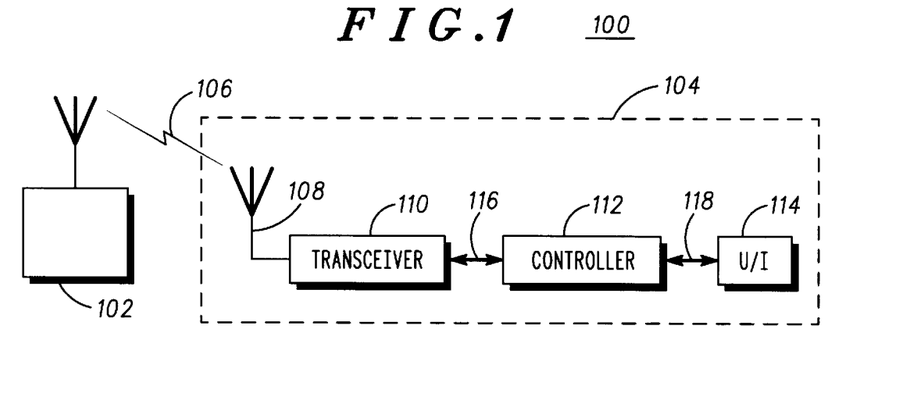
FIG. 1 is a block diagram illustrating a wireless communication system employing remote and local communication devices.

A communication system 100, shown in FIG. 1, comprises remote and local communication devices 102 and 104 that communicate via a wireless communication link 106. In the illustrated embodiment, the remote and local devices 102 and 104 are a cellular base station and a cellular radiotelephone, respectively, and the wireless link 106 comprises RF signals. The local device 104 includes an antenna 108, a transceiver 110, a controller 112, and a user interface 114. The user-interface 114 typically includes a microphone, a speaker, a keypad, a display, and an external test connector.

When the local device 104 is in a powered-on state, the RF signals of the wireless link 106 are received by the antenna 108 and converted by the transceiver into receive data signals, which are coupled to the controller 112 via bus 116. The controller 112 processes the received data and voice signals that are further coupled, via bus 118, to the user interface 114 for output. Voice and data input to the user interface 114 is coupled to the controller 112, via bus 118, for processing into transmit data signals. The controller 112 outputs the transmit signals on bus 116 for conversion by the transceiver 110 and emission by the antenna 108 as the RF signals of the wireless link 106.

Figure 2:
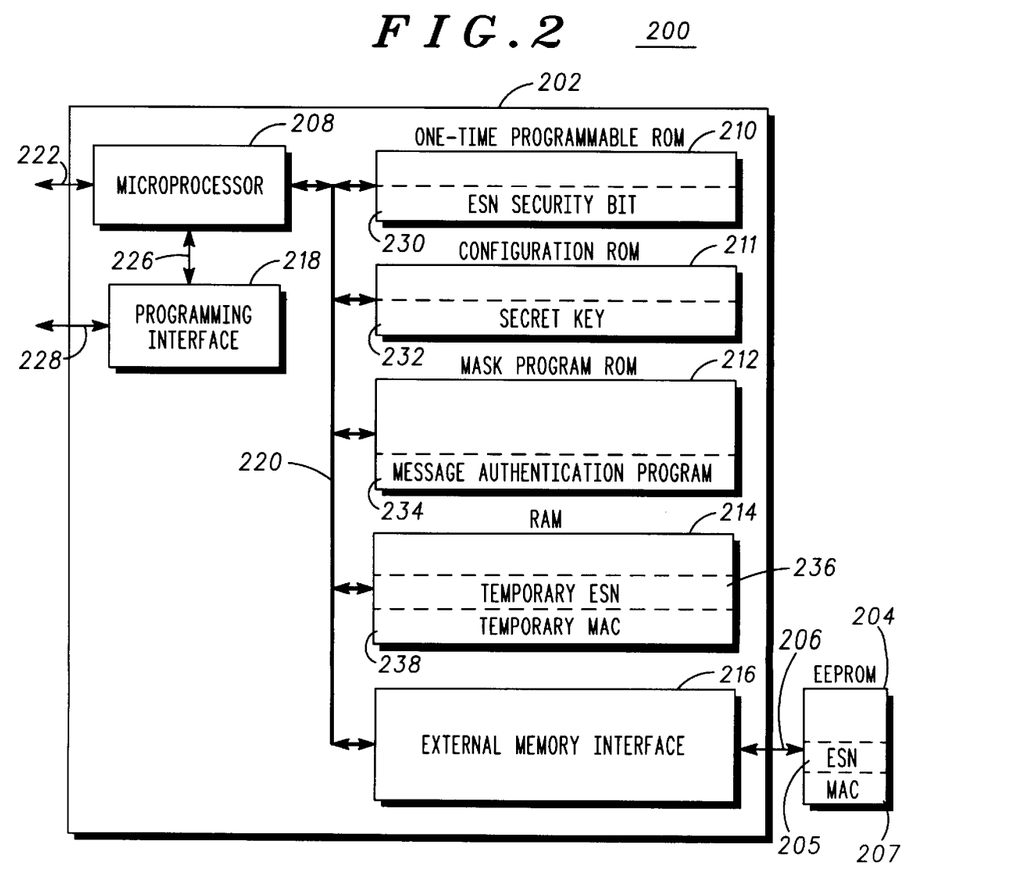
FIG. 2 is a block diagram of an apparatus employed in a controller of the local communication device of FIG. 1.

The controller 112 includes an apparatus 200, shown in FIG. 2. The apparatus 200 includes a microcontroller 202 and an EEPROM 204. The EEPROM 204 interfaces to the microcontroller 202 via a serial format. The EEPROM 204 includes a location for storing electronic information. In the illustrated embodiment, the electronic information is an electronic serial number (ESN) 205 consisting of a 32 binary bit number. The ESN 205 uniquely identifies the local device 104 of FIG. 1 and is used by the local device 104 of FIG. 1 to gain authorized access to the communication system 100. The EEPROM 204 of FIG. 2 also includes a location for storing electronic authentication information used to authenticate the electronic information. In the illustrated embodiment, the electronic authentication information is a message authentication code (MAC) 207 consisting of a 32 binary bit number.

The microcontroller 202 comprises a microprocessor 208, a one-time programmable ROM (read-only memory) 210, a configuration ROM 211, a mask program ROM 212, a RAM (random-access memory) 214, an external memory interface 216, and a programming interface 218. The microprocessor 208 is coupled to the programming interface 218 via serial bus 226, which is internal to the microcontroller 202. The microprocessor 208, the one-time programmable ROM 210, the configuration ROM 211, the mask program ROM 212, the RAM 214, and the external memory interface 216 are coupled by a common parallel bus 220, which is internal to the microcontroller 202. The microprocessor 208 is coupled to the transceiver 110, other circuitry of the controller 112, and the user interface 114 via bus 222, which extends outside of the microcontroller 202. The programming interface 218 is coupled to the user interface 114 via bus 228, which extends outside of the microcontroller 202. Busses 222 and 228 may form sub-busses of busses 116 and 118 of FIG. 1. The external memory interface 216 of FIG. 2 is coupled to the EEPROM 204 via bus 206, which extends outside of the microcontroller 202. The microcontroller 202 is preferably fabricated in a single integrated circuit using known semiconductor fabrication techniques.

The microprocessor 208 is a parallel device that operates responsive to program instructions and data for controlling the apparatus 200. The program instructions are electronic information stored in the mask program ROM 212 or a ROM (not shown) externally coupled to the microcontroller 202. The data is electronic information preferably stored in the configuration ROM 211 and the RAM 214. Via the common bus 220, the microprocessor 208 accesses the one-time programmable ROM 210, the configuration ROM 211, the mask program ROM 212, and the RAM 214 to retrieve electronic information, such as the program instructions and data, therefrom; to execute program instructions therein; to store electronic information therein; and the like. All bus transactions involving the common bus 220 are not visible outside of the microcontroller 202. The one-time programmable ROM 210, the mask program ROM 212, and the RAM 214 can not accessed outside of the microcontroller 202.

The one-time programmable ROM 210 includes a location for storing a security flag for preventing reprogramming of the electronic information. In the illustrated embodiment, the security flag is an ESN security bit 230 consisting of a one binary bit number. A binary "one" in the ESN security bit 230 indicates that the ESN 205 and MAC 207 have been programmed into the EEPROM 204. A binary "zero" in the ESN security bit 230 indicates that the ESN 205 and the MAC 207 have not been programmed into the EEPROM 204. The ESN security bit 230 is stored in the one-time programmable ROM 210 during programming of the electronic information, as further described below. The one-time programmable ROM 210 may be implemented by a fuse bank or other one time programmable technology.

The configuration ROM 211 includes a location for storing an encryption key used in the generation of the electronic authentication information. In the illustrated embodiment, the encryption key is a secret key 232 consisting of 64 binary bits that comprise a random 56 binary bit number and an 8 binary bit checksum. The secret key 232 is stored in the configuration ROM 211 during fabrication of the microcontroller 202, such as at wafer probe using laser trim or fusible link techniques. To ensure security of the secret key 232, the microcontroller 202 disables accesses to the secret key 232 while executing code external to the mask program ROM 212. Such security measures are further described in U.S. patent application Ser. No. 08/730,188, "Microcontroller Which Limits Access to Internal Memory", filed in behalf of Dorsey et al. on Oct. 14, 1996, and assigned to Motorola, Inc.

The mask program ROM 212 includes a location for storing instructions for authenticating the electronic information. In the illustrated embodiment, the instructions are a message authentication program 234. The message authentication program 234 is preferably stored in the mask program ROM 212 during fabrication of the microcontroller 202.

The RAM 214 provides locations for temporary storage of the electronic information and the electronic authentication information during programming and authentication processes described further below. In the illustrated embodiment, the electronic information is temporarily stored in the RAM 214 as a temporary ESN 236 comprising a 32 binary bit number and the electronic authentication information is temporarily stored in the RAM 214 as a temporary MAC 238 comprising a 32 binary bit number.

The external memory interface 216 provides compatibility between the microprocessor 208 and the EEPROM 204. The external memory interface 216 converts electronic information output by the microprocessor 208 from a parallel format on bus 220 into a serial format on bus 206. Likewise, the external memory interface 216 converts electronic information retrieved from the EEPROM 204 via bus 206 from a serial format into a parallel format on bus 220.

The programming interface 218 permits programming of the electronic information into the apparatus 200. The programming interface 218 provides compatibility between the microprocessor 208 and an external programming fixture (not shown) that detachably couples to the external test connector of the user interface 114. In the illustrated embodiment, the programming interface 218 converts the electronic information output by the external programming fixture from a proprietary protocol, such as the three-wire bus protocol or the DSC (Digital Speech Control) protocol, on bus 228 into a serial format on bus 226. Likewise, the programming interface 218 converts electronic information output by the microprocessor 208 from a serial format on bus 226 into the proprietary protocol on bus 228.

Figure 3:
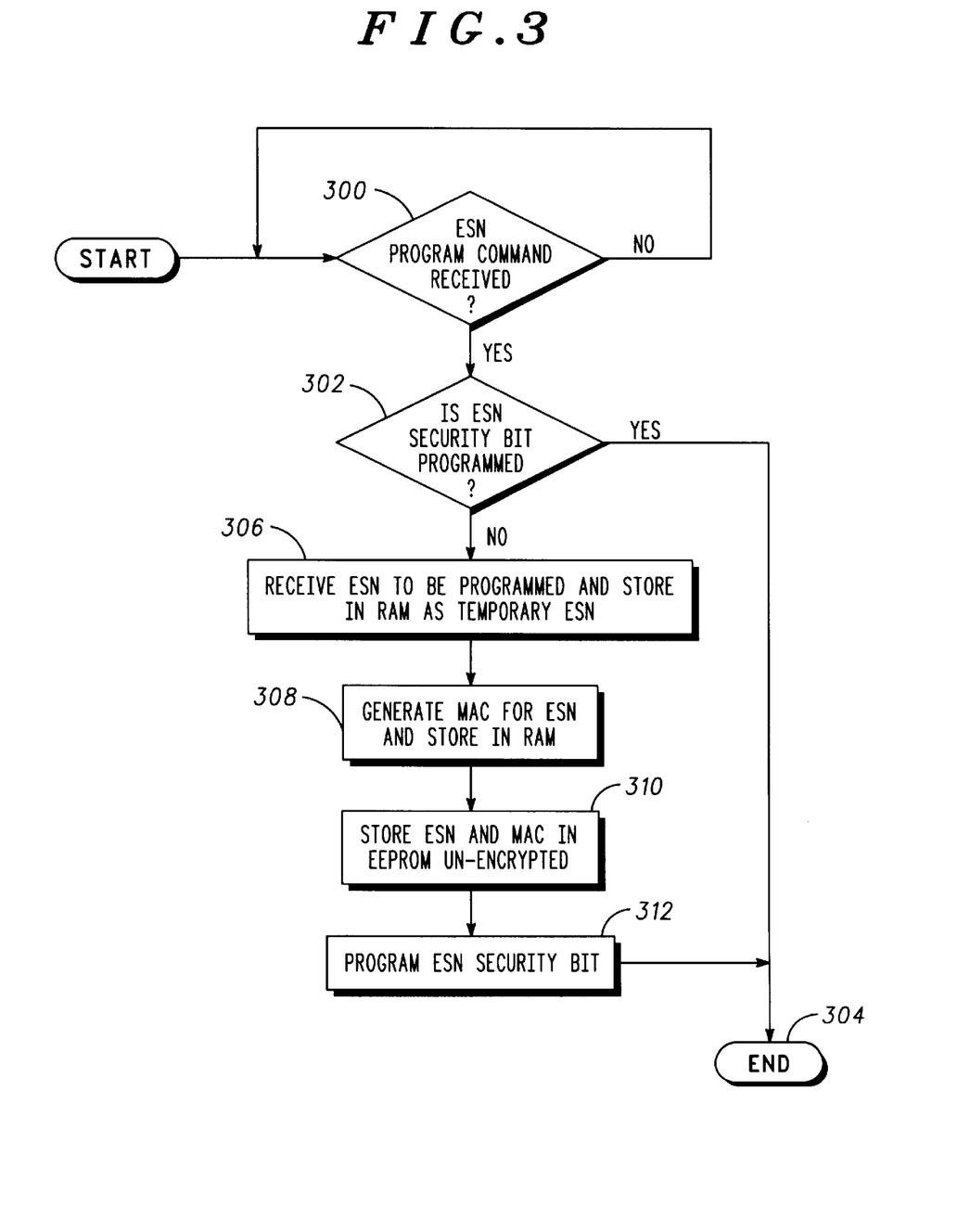
FIG. 3 is a flowchart illustrating a method employed by the apparatus of FIG. 2 for programming electronic information therein.

The electronic information is programmed into the apparatus 200 according to a method illustrated in FIG. 3. The method of FIG. 3 is described hereinbelow in conjunction with FIG. 2. The method is performed by the microprocessor 208 as part of its program instructions. The method is initiated upon attachment of the programming fixture to the programming interface 218 (via the user interface 114 and bus 228) and reception of an ESN program command from the programming fixture (at block 300). Upon reception of the command, the microprocessor 208 reads the ESN security bit 230 from the one-time programmable ROM 210 (at block 302). If the ESN security bit 230 is a binary "one" (i.e., the ESN security bit 230 has already been programmed), the microprocessor 208 responds to the ESN program command by halting this subsequent attempt to program an ESN into the EEPROM 204 (at block 304).

If the ESN security bit 230 is a binary "zero", the microprocessor 208 proceeds to program the EEPROM 204. The microprocessor 208 responds to the ESN program command by receiving an ESN from the programming fixture and temporarily storing this ESN in the RAM 214 as the temporary ESN 236 (at block 306). The microprocessor 208 generates a MAC associated with the temporary ESN 236 and stores this MAC in the RAM 214 as the temporary MAC 238 (at block 308).

Figure 4:
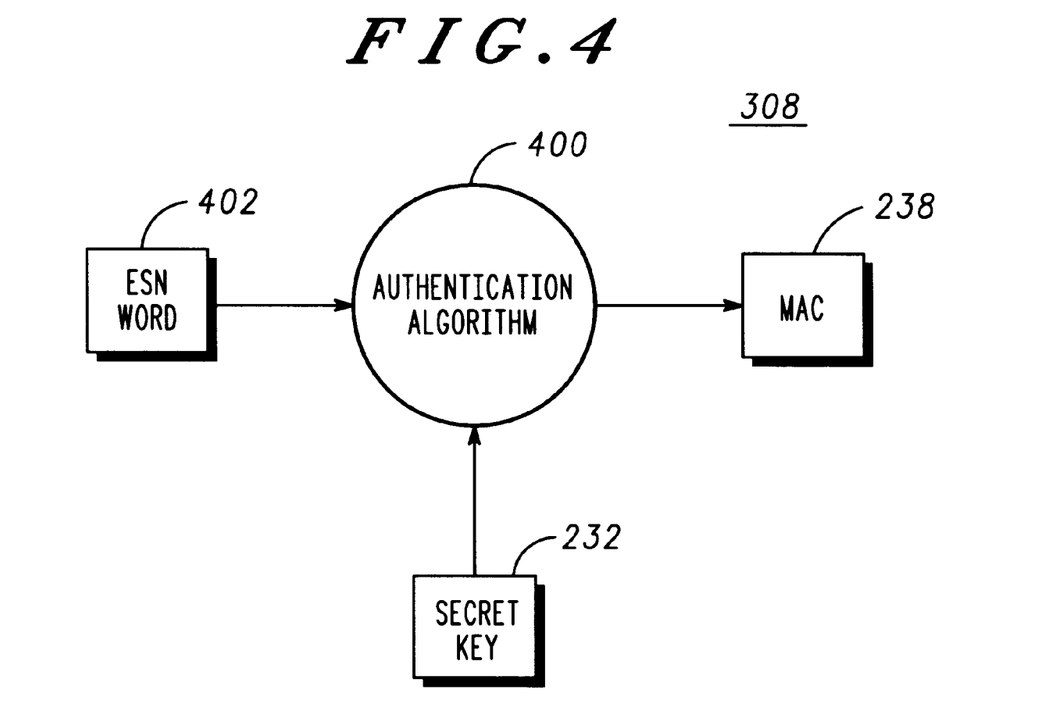
FIG. 4 is a functional block diagram illustrating a method employed by the apparatus of FIG. 2 for generating an authentication code associated with the electronic information of FIG. 3.

The temporary MAC 238 is generated according to a method illustrated in FIG. 4. The method is embodied in the message authentication program 234 of FIG. 2 stored in the mask program ROM 212. The message authentication program 234 is executed from the mask program ROM 212 by the microprocessor 208. The message authentication program 234 comprises an authentication algorithm 400 of FIG. 4. The authentication algorithm 400 is an encryption algorithm that generates electronic authentication information from electronic information using an encryption key.

In the illustrated embodiment, the authentication algorithm 400 is the Data Authentication Algorithm (DAA) defined by the National Institute of Standards of the U.S. Department of Commerce in FIPS (Federal Information Processing Standards) Publication No. 113. The DAA uses the Data Encryption Standard (DES) defined by the National Institute of Standards of the U.S. Department of Commerce in FIPS Publication No. 46-1. To generate the temporary MAC 238, the microprocessor 208 retrieves the secret key 232 from the configuration ROM 211 and inputs the secret key 232 and an ESN word 402 to the authentication algorithm 400.

For compatibility with the DES, the ESN word 402 comprises a 64 bit binary number or a multiple of a 64 bit binary number. In one embodiment, the microprocessor 208 generates the ESN word 402 by appending 32 binary "zero" bits to the end of the temporary ESN 236. In another embodiment, the microprocessor 208 appends a message, such as a hash code, to the end of the temporary ESN 236. A hash code is a condensed representation of a larger message. One example of the hash code would be a 32 binary bit check sum generated from the contents of the mask program ROM 212. Another example would be a message digest generated in accordance with the Secure Hash Algorithm (SHA-1) defined by the National Institute of Standards of the U.S. Department of Commerce in FIPS Publication No. 180-1. The message digest is a 160 binary bit number generated by the SHA-1 from any message up to $2^{64}$ binary bit numbers in length, such as the program instructions stored in the mask program ROM 212 or the ROM (not shown) external to the microcontroller 202. Any changes to the message (i.e., the program instructions of the mask program ROM or the external ROM) will result in the generation of a different message digest. Once generated, the message digest can be stored in the EEPROM 204.

Although the DAA, the DES, and the SHA-1 are preferably employed in the illustrated embodiment, one skilled in the art will recognize that other cryptographic algorithms can alternatively be used to generate the electronic authentication information and, thus, "algorithm" as used herein shall refer to each of these and their equivalents.

Referring back to FIGS. 2 and 3, once the temporary MAC 238 is generated, the microprocessor 208 stores the temporary ESN 236 and the temporary MAC 238 in the EEPROM 204 as the ESN 205 and the MAC 207, respectively (at block 310). The ESN 205 and the MAC 207 stored in the EEPROM 204 are not encrypted. The microprocessor 208 programs the ESN security bit 230 in the one-time programmable ROM 210 to have a binary "one" value (at block 312). Once the ESN security bit 230 is programmed, the method of programming the electronic information is concluded (at block 304).

Figure 5:
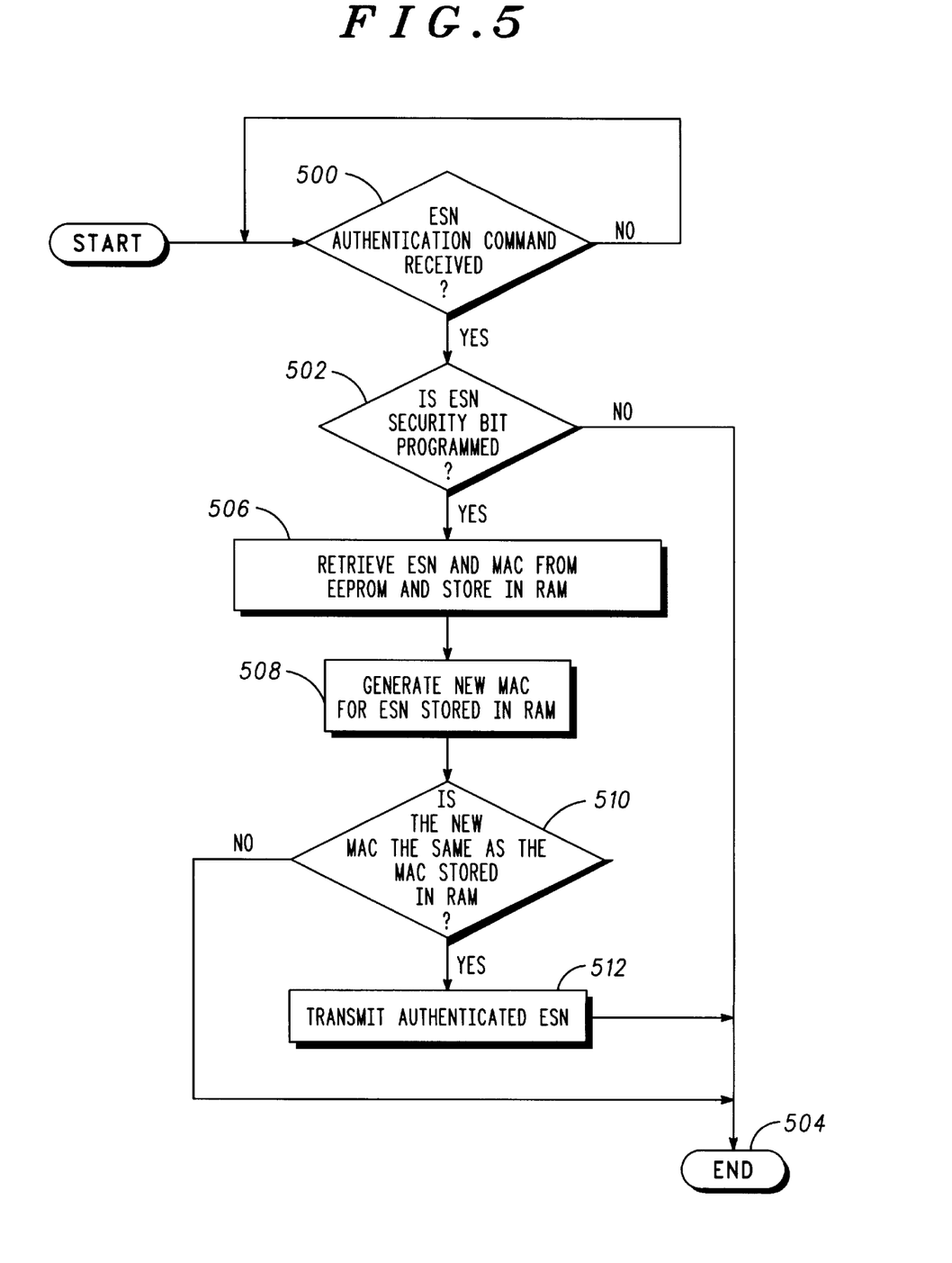
FIG. 5 is a flowchart illustrating a method employed by the apparatus of FIG. 2 to authenticate the electronic information of FIG. 3.

Prior to making calls, the local device 104 of FIG. 1 must transmit the ESN 205 of FIG. 2 to the remote device 102 of FIG. 1 for registration on the communication system 100. If registration is not accomplished, no calls can be made or received by the local device 104. Prior to transmitting the ESN 205 to the remote device 102, the apparatus 200 of FIG. 2 authenticates the ESN 205 according to a method illustrated in FIG. 5. Authentication minimizes the opportunity for fraudulent use of the ESN 205 in the local device 104 or other local devices for use in the communication system 100. The method of FIG. 5 is described hereinbelow in conjunction with FIG. 2. The method is embodied in the message authentication program 234 stored in the mask program ROM 212. The message authentication program 234 is executed from the mask program ROM 212 by the microprocessor 208. Control of the execution of the message authentication program 234 is secured by means described in U.S. patent application Ser. No. 08/730,188, previously cited.

The method is initiated during a power-up sequence of the local device 104 when the message authentication program 234 receives an ESN authentication command from the microprocessor 208 (at block 500). Upon reception of the command, the message authentication program 234 directs the microprocessor 208 to read the ESN security bit 230 from the one-time programmable ROM 210 (at block 502). If a binary "zero" is read (i.e., the ESN security bit 320 has not been programmed), the message authentication program 234 halts authentication and flags the microprocessor 208 to prevent registration (at block 504).

If a binary "one" is read in the ESN security bit 230 (i.e., the ESN security bit 230 has been programmed), the message authentication program 234 proceeds to authenticate the ESN 205. The message authentication program 234 directs the microprocessor 208 to retrieve the ESN 205 and the MAC 207 from the EEPROM 204 and store the ESN 205 and the MAC 207 as the temporary ESN 236 and the temporary MAC 238, respectively, in the RAM 214 (at block 506). The message authentication program 234 directs the microprocessor 208 to generate a new MAC from the temporary ESN 236 (at block 508). The new MAC is generated in the manner previously described with respect to FIG. 4 and generation of the temporary MAC 238 during programming. That is, the authentication algorithm 400 generates the new MAC from the temporary ESN 236 and the secret key 232.

Once generated, the message authentication program 234 directs the microprocessor 208 to compare the new MAC with the temporary MAC 238 (at block 510). If the new MAC and the temporary MAC 238 do not match, the message authentication program 234 flags the microprocessor 208 to prevent registration (at block 504). If the new MAC and the temporary MAC 238 are the same, the ESN 205 is authenticated. The message authentication program 234 flags the microprocessor 208 to proceed with registration and transmit the ESN 205 to the remote device 102 (at block 512). Once the microprocessor 208 is flagged to transmit the ESN 205, the method of authenticating the ESN 205 is concluded (at block 504).

Although illustrated in a cellular radiotelephone, programming and authenticating electronic information as described herein will also find application in cordless telephones, two-way radios, trunked radios, pagers, personal digital assistants, and the like, and "device" as used herein shall refer to each of these and their equivalents.

Although the present apparatus and method is shown to secure an ESN in an external memory device, one skilled in the art will recognize that other electronic information, such as program instructions stored in a ROM external to the microcontroller, could be similarly secured. By associating the program instructions in the ROM with both a security flag contained in the microcontroller and electronic authentication information stored in the ROM and performing authentication on the program instructions during the power-up sequence of the communication device, unauthorized reprogramming and swapping out of the external ROM can be deterred.

Thus, it can be seen that fraudulent use of electronic information to gain access to a communication system, such as a cellular radiotelephone system, can be minimized even if the electronic information, such as an ESN, is stored un-encrypted in a memory device, such as an EEPROM, external to a microcontroller integrated circuit. By employing a one-time programmable security bit in the microcontroller, reprogramming of the ESN is prevented. By employing a random, secret key-based authentication algorithm that creates and requires an association between the ESN and electronic authentication information, such as a MAC, system access can not be achieved by swapping out the EEPROM with another EEPROM containing a different ESN and MAC.

What is claimed is:

1. An apparatus for securing electronic information in a wireless communication device, the wireless communication device for use in a wireless communication system, the apparatus comprising:

an external memory for storing the electronic information, the electronic information for use by the wireless communication device to establish communication with the wireless communication system; and a microcontroller coupled to the external memory, the microcontroller comprising a programming interface and a one-time programmable memory for storage of a security flag, the microcontroller, upon determining that the security flag has not been previously programmed and receiving the electronic information at the programming interface, storing the electronic information in the external memory and programming the security flag to indicate storage of the electronic information in the external memory, and the microcontroller, upon determining that the security flag has been previously programmed, preventing reprogramming of the external memory.

2. An apparatus according to claim 1 wherein the microcontroller further comprises an internal bus, the internal bus for transacting communications within the microcontroller, said communications not visible outside of the microcontroller.

3. An apparatus according to claim 2 wherein the microcontroller further comprises a mask program memory coupled to the internal bus, the mask program memory storing an authentication algorithm, and the microcontroller, upon receiving the electronic information at the programming interface, executing the authentication algorithm to generate electronic authentication information from the electronic information.

4. An apparatus according to claim 3
further comprising an external bus coupled to the external memory; and
wherein the microcontroller further comprises an external memory interface coupled between the internal bus and the external bus, and the microcontroller stores the electronic authentication information in the external memory.

5. An apparatus according to claim 3 wherein
the microcontroller further comprises a configuration memory storing an encryption key,
the electronic information is an electronic serial number (ESN),
the electronic authentication information is a message authentication code (MAC), and
the authentication algorithm uses the encryption key and the ESN as input information and generates the MAC as output information.

6. An apparatus according to claim 5 wherein
the ESN is input to the authentication algorithm as an ESN word having a multiple of a 64 bit number, and
the secret encryption key is a 64 bit number consisting of a random 56 bit number and an 8 bit checksum.

7. A An apparatus according to claim 1 wherein the microcontroller is fabricated in a single integrated circuit.

8. An apparatus according to claim 1 wherein the electronic information stored in the external memory is un-encrypted.

9. An apparatus according to claim 1 wherein the electronic information is an electronic serial number (ESN).

10. An apparatus for securing electronic information in a wireless communication device, the wireless communication device for use in a wireless communication system, the apparatus comprising:

an external memory storing the electronic information and electronic authentication information associated therewith, the electronic information for use by the wireless communication device to establish communication with the wireless communication system; and a microcontroller coupled to the external memory, the microcontroller comprising a program memory storing an authentication algorithm, the microcontroller, upon request from the wireless communication device to establish communication with the wireless communication system, retrieving the electronic information and the electronic authentication information from the external memory, executing the authentication algorithm to generate new electronic authentication information from the retrieved electronic information, forwarding the electronic information for establishing communication with the wireless communication system when the new electronic authentication information matches the retrieved electronic authentication information, and preventing forwarding of the electronic information for establishing communication with the wireless communication system when the new electronic authentication information does not match the retrieved electronic authentication information.

11. An apparatus according to claim 10 wherein the microcontroller further comprises an internal bus, the internal bus for transacting communications within the microcontroller, said communications not visible outside of the microcontroller.

12. An apparatus according to claim 11 wherein the microcontroller further comprises a configuration memory coupled to the internal bus, the configuration memory storing an encryption key for use by the authentication algorithm.

13. An apparatus according to claim 11
further comprising an external bus coupled to the external memory; and wherein
the microcontroller further comprises an external memory interface coupled to the internal bus and the external bus, and the microcontroller, upon generating the authentication information, transfers the electronic information and the electronic authentication information from the external memory for authentication in the microcontroller.

14. An apparatus according to claim 11 wherein the microcontroller further comprises a one-time programmable memory coupled to the internal bus, the one-time programmable memory storing a security flag, and the microcontroller, prior to retrieving the electronic information and the electronic authentication information from the external memory, determining that the security flag has previously been programmed to indicate storage of the electronic information and the electronic authentication information in the external memory.

15. A wireless communication device according to claim 10 wherein the microcontroller is fabricated in a single integrated circuit.

16. An apparatus according to claim 10 wherein the electronic information stored in the external memory is un-encrypted.

17. An apparatus according to claim 10 wherein the electronic information is an electronic serial number (ESN).

18. An apparatus according to claim 17 wherein the microcontroller further comprises a configuration memory storing an encryption key, the new electronic authentication information is a new message authentication code (MAC), and the authentication algorithm uses the encryption key and the ESN as input information and generates the new MAC as output information.

19. An apparatus according to claim 18 wherein the ESN is input to the authentication algorithm as an ESN word having a multiple of a 64 bit number, and the secret encryption key is a 64 bit number consisting of a random 56 bit number and an 8 bit checksum.

20. A wireless communication device having a power-on state and for use in a wireless communication system, the wireless communication device comprising:

an antenna;

a transceiver coupled to the antenna;

a user interface; and a controller coupled to the transceiver and the user interface, the controller comprising:

an external memory storing an electronic serial number (ESN) in an un-encrypted form and electronic authentication information associated with the ESN, the ESN for use by the wireless communication device to obtain registration on the wireless communication system, and a microcontroller coupled to the external memory, the microcontroller comprising:

a one-time programmable memory storing a security flag, a program memory storing an authentication algorithm, and a microprocessor coupled to the external memory, the one-time programmable memory, and the program memory, the microprocessor, responsive to initiation of the power-on state and determination that the security flag indicates that the ESN is stored in the external memory, retrieving the ESN and the electronic authentication information from the external memory, authenticating the ESN using the authentication algorithm, and, once authenticated, coupling the ESN to the transceiver for transmission in the wireless communication system.

21. A wireless communication device according to claim 20 wherein the microcontroller authenticates the ESN by executing the authentication algorithm to generate new electronic authentication information from the retrieved ESN, and forwarding the retrieved ESN for transmission when the new electronic authentication information matches the retrieved electronic authentication information.

22. A wireless communication device according to claim 21 wherein the microcontroller further comprises a configuration memory storing an encryption key, the new electronic authentication information is a new message authentication code (MAC), and the authentication algorithm uses the encryption key and the ESN as input information and generates the new MAC as output information.

23. An apparatus according to claim 22 wherein the ESN is input to the authentication algorithm as an ESN word having a multiple of a 64 bit number, and the secret encryption key is a 64 bit number consisting of a random 56 bit number and an 8 bit checksum.

24. A wireless communication device for use in a wireless communication system, the wireless communication device comprising:

an antenna;

a transceiver coupled to the antenna;

a user interface; and a controller coupled to the transceiver and the user interface, the controller comprising:

a microcontroller comprising:

a programming interface;

a one-time programmable read-only memory (ROM) for storing an electronic serial number (ESN) security flag;

a configuration ROM for storing a secret key;

a mask program ROM for storing a message authentication program;

a random-access memory (RAM) for storing a temporary ESN and a temporary message authentication code (MAC);

an external memory interface;

a microprocessor coupled to the programming interface, the one-time programmable ROM, the configuration ROM, the mask program ROM, the RAM and the external memory interface; and an electronically erasable programmable read only memory (EEPROM) external to the microcontroller, the EEPROM coupled to the external memory interface, the EEPROM for storing an ESN and a MAC.

25. A wireless communication device according to claim 24 wherein the microprocessor, upon receiving an ESN program command at the programming interface, determines that the security flag is not programmed with a value indicating prior storage of an ESN in the EEPROM, receives the ESN at the programming interface, stores the ESN in the RAM as the temporary ESN, executes the message authentication program to generate the MAC for the temporary ESN, stores the MAC in the RAM as the temporary MAC, stores the temporary ESN in the EEPROM as the ESN, stores the temporary MAC in the EEPROM as the MAC, and programs the security flag of the one-time programmable memory to indicate storage of the ESN in the EEPROM.

26. A wireless communication device according to claim 25 wherein the microprocessor, upon receiving an ESN authentication command, determines that the security flag is programmed with a value indicating prior storage of the ESN in the EEPROM, retrieves the ESN and the MAC from the EEPROM, stores the ESN in the RAM as the temporary ESN, stores the MAC in the RAM as the temporary MAC, executes the message authentication program to generate a new MAC for the temporary ESN, compares the new MAC to the temporary MAC, and provides the temporary ESN to the transceiver for transmission in the wireless communication system when the new MAC matches the temporary MAC.

* * * * *